(12) United States Patent
Yun

(10) Patent No.: US 11,525,294 B2
(45) Date of Patent: Dec. 13, 2022

(54) STRUCTURE FOR PREVENTING SLIDING DOOR FROM SWAYING

(71) Applicants: Hyundai Motor Company, Seoul (KR); Kia Motors Corporation, Seoul (KR)

(72) Inventor: Hyung-In Yun, Seoul (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 126 days.

(21) Appl. No.: 17/218,399

(22) Filed: Mar. 31, 2021

(65) Prior Publication Data

US 2022/0120131 A1 Apr. 21, 2022

(30) Foreign Application Priority Data

Oct. 16, 2020 (KR) .................. 10-2020-0134126

(51) Int. Cl.
*E05D 15/10* (2006.01)
*B60J 5/06* (2006.01)

(52) U.S. Cl.
CPC .............. *E05D 15/101* (2013.01); *B60J 5/06* (2013.01); *E05D 2015/1026* (2013.01)

(58) Field of Classification Search
CPC .......... E05D 15/101; E05D 2015/01626; B60J 5/047; B60J 5/06
USPC ....................................................... 296/155
See application file for complete search history.

(56) References Cited

U.S. PATENT DOCUMENTS

| | | | | |
|---|---|---|---|---|
| 3,051,999 A | * | 9/1962 | Schimek | E05D 15/06 16/370 |
| 5,979,971 A | * | 11/1999 | Mizuki | B60L 50/66 49/213 |
| 7,611,190 B1 | * | 11/2009 | Elliott | B60J 5/06 49/248 |
| 7,658,438 B1 | * | 2/2010 | Elliott | E05D 15/1081 296/155 |
| 7,954,880 B2 | * | 6/2011 | Kunishima | E05D 15/1081 296/146.12 |
| 9,440,519 B2 | * | 9/2016 | Choi | E05D 15/101 |
| 9,701,183 B2 | * | 7/2017 | Choi | E05D 15/101 |
| 10,138,662 B2 | * | 11/2018 | Yun | E05C 17/50 |
| 10,443,282 B2 | * | 10/2019 | Bauer | E05D 15/1047 |
| 2015/0167370 A1 | * | 6/2015 | Choi | E05D 15/1081 403/83 |

(Continued)

FOREIGN PATENT DOCUMENTS

KR 101684536 B1 12/2016

*Primary Examiner* — Jason S Morrow
(74) *Attorney, Agent, or Firm* — Slater Matsil, LLP

(57) ABSTRACT

A structure includes a rail mounted on a vehicle body, a rail roller device connected to the rail, a slider mounted on the rail roller device, a movement support device having a first side fixed to a door and a second side connected to the slider, and a catch-pawl locking device including catches and pawls locked to or unlocked from one another while rotating. The catches and the pawls include a first catch and a first pawl for restricting a movement of the rail roller device in a first direction when the first catch and the first pawl are locked to each other, and a second catch and a second pawl for restricting a movement of the movement support device in a second direction perpendicular to the first direction when the second catch and the second pawl are locked.

20 Claims, 12 Drawing Sheets

(56) References Cited

U.S. PATENT DOCUMENTS

2016/0356069 A1 12/2016 Choi et al.
2020/0240186 A1* 7/2020 Kuroiwa ............. E05D 15/1047

* cited by examiner

STRUCTURE FOR PREVENTING SLIDING DOOR FROM SWAYING

CROSS-REFERENCE TO RELATED APPLICATIONS

This application claims the benefit of Korean Patent Application No. 10-2020-0134126, filed in the Korean Intellectual Property Office on Oct. 16, 2020, which application is hereby incorporated herein by reference.

TECHNICAL FIELD

The present invention relates to a structure for preventing a sliding door from swaying.

BACKGROUND

In general, a vehicle has an occupant compartment having a predetermined size in which a driver or an accompanied occupant may be seated, and occupant compartment opening/closing doors are installed on a vehicle body to open or close the occupant compartment.

Sliding type occupant compartment opening/closing doors include a front sliding door installed at a front side in a longitudinal direction of a vehicle and a rear sliding door installed at a rear side in the longitudinal direction of the vehicle. The front sliding door and the rear sliding door are typically installed to be moved along rails mounted on a vehicle body or the doors.

However, the sliding type occupant compartment opening/closing door in the related art requires three rails (an upper rail, a center rail, and a lower rail) that support an upper portion, a middle portion, and a lower portion of the door, respectively, during the process of opening or closing the door, and the sliding type occupant compartment opening/closing door also requires components related to the rails. For this reason, the sliding type occupant compartment opening/closing door in the related art has a problem in that the weight of the vehicle and the number of components are increased and a degree of design freedom of the vehicle deteriorates.

Therefore, there has been developed a two-rail type door system for a vehicle in which a sliding door is slidably supported only with center and lower rails. For example, Korean Patent No. 10-1684536 (Sliding Door System for Vehicle) in the related art discloses that a door rail (i.e., a center rail) is mounted on a sliding door, a vehicle body rail (i.e., a lower rail) is mounted on a vehicle body, and the sliding door is opened or closed as a center slider coupled to the door rail and a lower slider coupled to the vehicle body rail are moved.

However, referring to FIG. 1, in the sliding structure in the related art, as support points at which the sliding door is supported, two support points, including a contact point A between the vehicle body rail 10 and the lower slider and a contact point B between the center rail 20 and the center slider, are formed in a vertical direction. However, there is a problem in that the sliding door rotates about an imaginary axis X connecting the contact points. In addition, because the support points for the sliding door are formed only on the imaginary axis X, there remains only one contact point A in a load direction (direction of the imaginary axis X) when a load of the sliding door is applied, and as a result, there is a problem in that the sliding door cannot be stably supported, and the sliding door sways while moving.

SUMMARY

The present invention relates to a structure for preventing a sliding door from swaying. Particular embodiments relate to a structure for preventing a sliding door from swaying, the structure being capable of preventing sway of the sliding door in a vehicle mounted with the sliding door and having only lower rails.

Embodiments of the present invention provide a new type of structure capable of preventing sway of a sliding door and supporting a load while the sliding door is opened or closed in a vehicle mounted with the sliding door and having only lower rails.

An exemplary embodiment of the present invention provides a structure for preventing a sliding door from swaying, the structure including a slider rollably connected to a rail, a movement support unit fixed, at one side thereof, to a door, rollably connected, at the other side thereof, to the slider, and configured to support the door, and a catch-pawl locking unit including catches and pawls configured to be locked to or unlocked from one another while rotating, in which when the catch is rotated by being caught by a catching member, the catch restricts a movement of the slider in a first direction or a movement of the movement support unit in a second direction in conjunction with the pawl.

According to embodiments of the present invention, the following effects are achieved.

First, rotation factors required to rotate a door in a vehicle mounted with sliding doors in the related art are removed, and as a result, it is possible to minimize the sway of the door when the door operates.

Second, an upper part and a center part configured to move a door in a vehicle mounted with sliding doors in the related art are removed, and as a result, it is possible to improve a degree of design freedom of a vehicle and ensure an interior package space.

Third, the movement support unit and the rail roller unit may prevent the sway of the door while supporting the door when the door operates.

Fourth, in order to prevent the sway of the door, the movement of the door in any one of the first and second directions is controlled and restricted while the door moves in the other of the first and second directions.

DETAILED DESCRIPTION OF ILLUSTRATIVE EMBODIMENTS

Hereinafter, a structure for preventing a sliding door from swaying according to exemplary embodiments of the present invention will be described in detail with reference to the drawings. Terms or words used herein should not be interpreted as being limited to a general or dictionary meaning and should be interpreted as a meaning and a concept which conform to the technical spirit of the present invention based on a principle that an inventor can appropriately define a concept of a term in order to describe his/her own invention by the best method.

Figure 1:
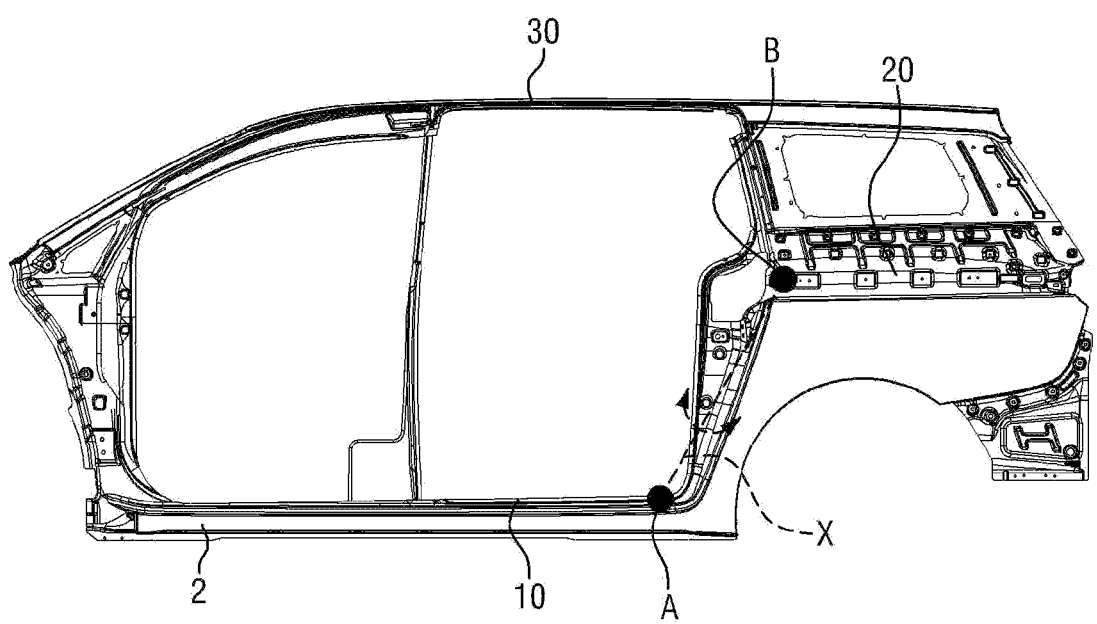
FIG. 1 is a view illustrating support points at which a sliding door for a vehicle in the related art is supported.

According to an exemplary embodiment of the present invention, a vehicle has only a lower rail 100 (a rail provided at a lower side of the vehicle) but has neither center rail 20 (a rail provided at a center of the vehicle illustrated in FIG. 1) nor upper rail 30 (a rail provided at an upper side of the vehicle illustrated in FIG. 1).

The sliding doors 1 include a front door and a rear door, and the structure for preventing a sliding door from swaying according to an exemplary embodiment of the present invention is applied to the lower rail 100 of the front door or the rear door. Therefore, the structures for preventing a sliding door from swaying, which are applied to the front door and the rear door, respectively, are identical in configuration and operational principle. However, in the present specification, an example in which the structure for preventing a sliding door from swaying is applied to any one of the sliding doors 1 will be described.

Figure 2:
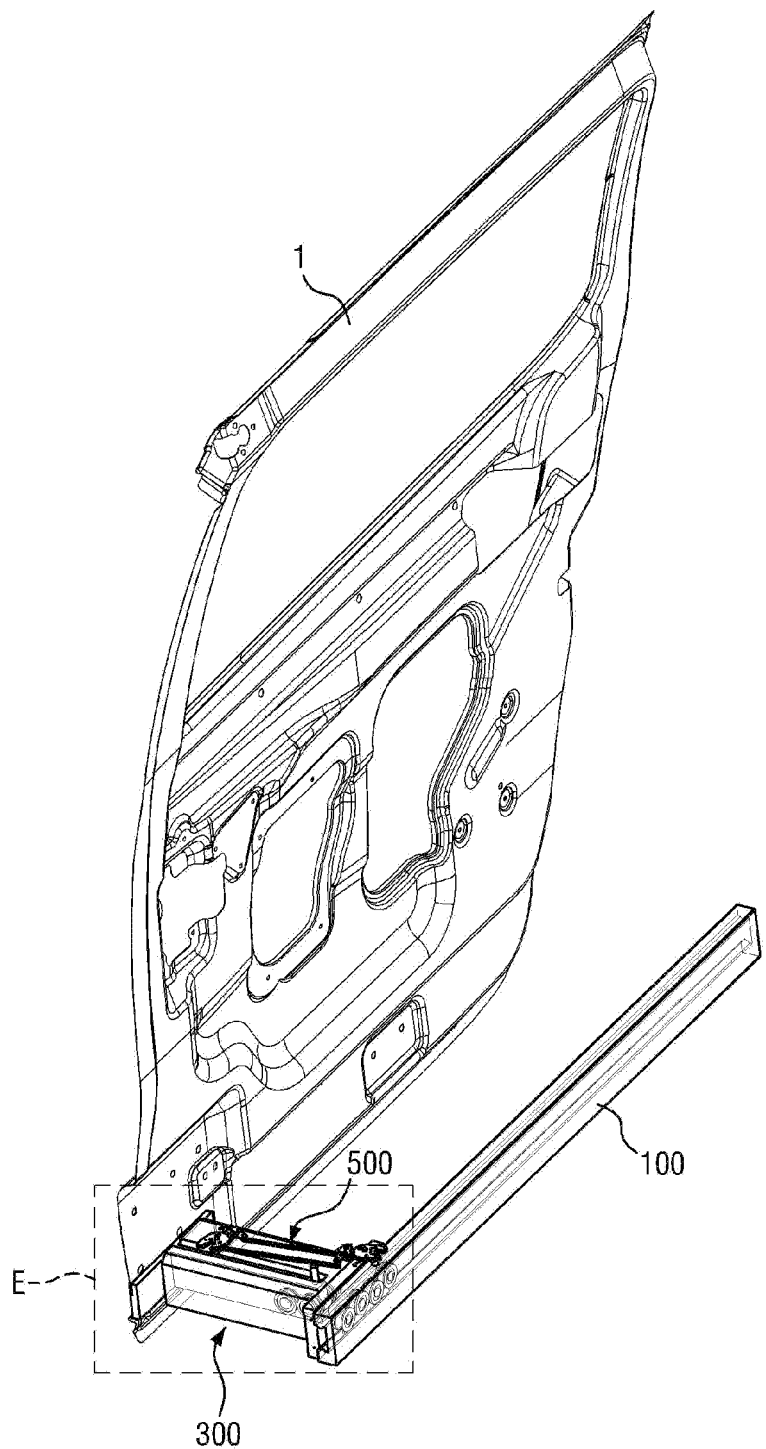
FIG. 2 is a view illustrating a state in which a structure for preventing a sliding door from swaying according to an exemplary embodiment of the present invention is applied to a door.
Figure 3:
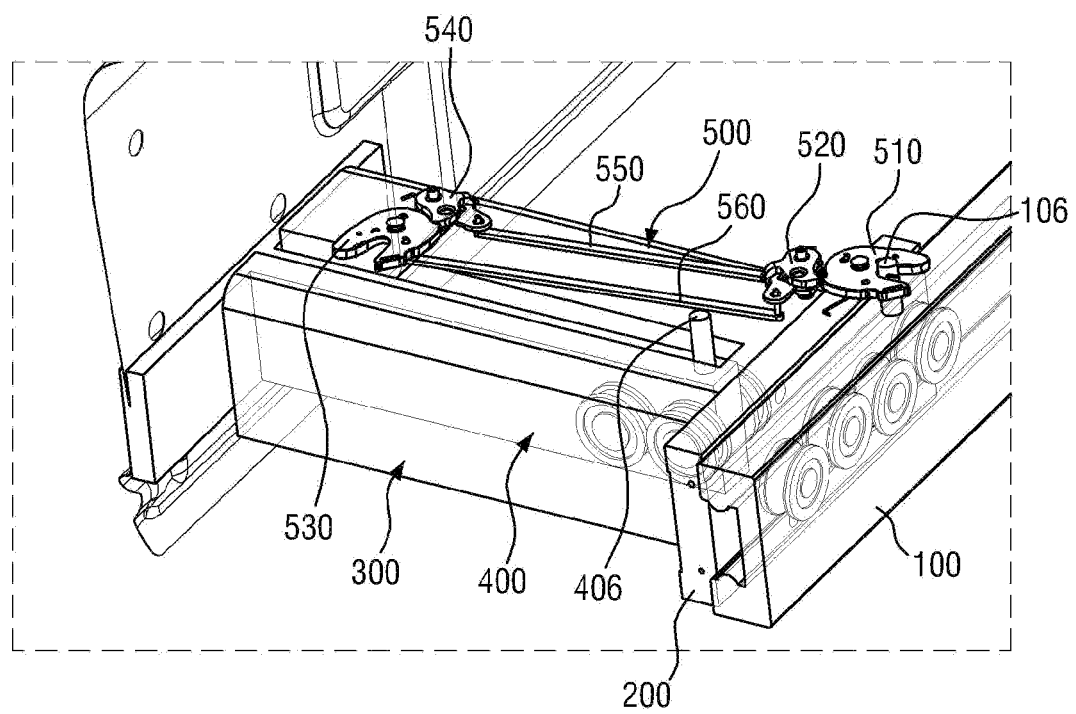
FIG. 3 is an enlarged view of part E in FIG. 2.

FIG. 2 is a view illustrating a state in which the structure for preventing a sliding door from swaying according to an exemplary embodiment of the present invention is applied to a door, and FIG. 3 is an enlarged view of part E in FIG. 2.

Referring to FIGS. 2 and 3, the structure for preventing a sliding door from swaying according to an exemplary embodiment of the present invention is provided at lower side of a vehicle body 2 and a door 1 and includes the lower rail 100, a rail roller unit 200, a slider 300, a movement support unit 400, and a catch-pawl locking unit 500.

In this case, the rail roller unit 200 moves in a longitudinal direction (T direction) of the vehicle body 2, and the T direction is defined as a first direction in the present specification. Further, the movement support unit 400 moves in a width direction (L direction) of the vehicle body 2, and the L direction is defined as a second direction in the present specification.

Figure 4:
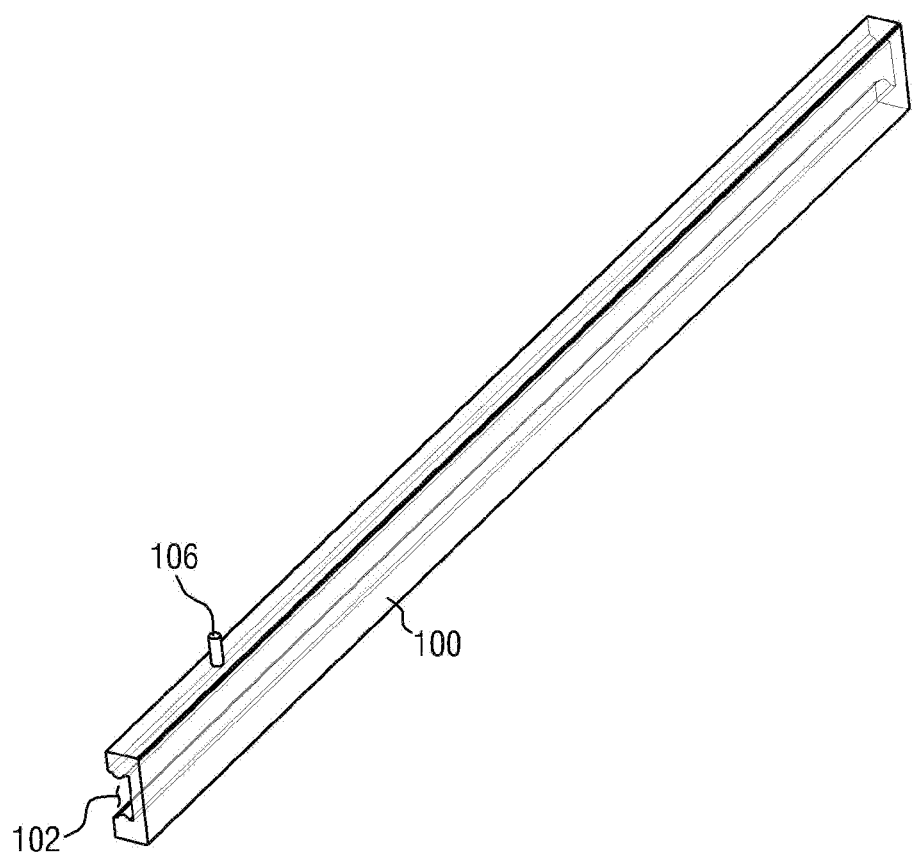
FIG. 4 is a view illustrating a lower rail according to an exemplary embodiment of the present invention.

FIG. 4 is a view illustrating the lower rail according to an exemplary embodiment of the present invention.

Referring to FIG. 4, the lower rail 100 is elongated in the longitudinal direction of the vehicle body 2 and mounted on the vehicle body 2. In an exemplary embodiment of the present invention, the lower rail 100 is a rectilinear rail.

A roller groove 102 is formed in one surface (a surface facing the door 1) of the lower rail 100. A first striker 106 is provided at one side of the lower rail 100. The first striker 106 may be a catching member, which may be caught by a first catch 510 to be described below, and may have various shapes. In an exemplary embodiment of the present invention, the first striker 106 has an approximately cylindrical shape.

The rail roller unit 200 is rollably connected to the lower rail 100. First rollers 202 are provided on one surface of the rail roller unit 200 and inserted into the roller groove 102 of the lower rail 100. When the first rollers 202 are inserted into the roller groove 102, the rail roller unit 200 may roll in the first direction along the lower rail 100. In this case, the first roller 202 functions as a bearing.

Figure 5:
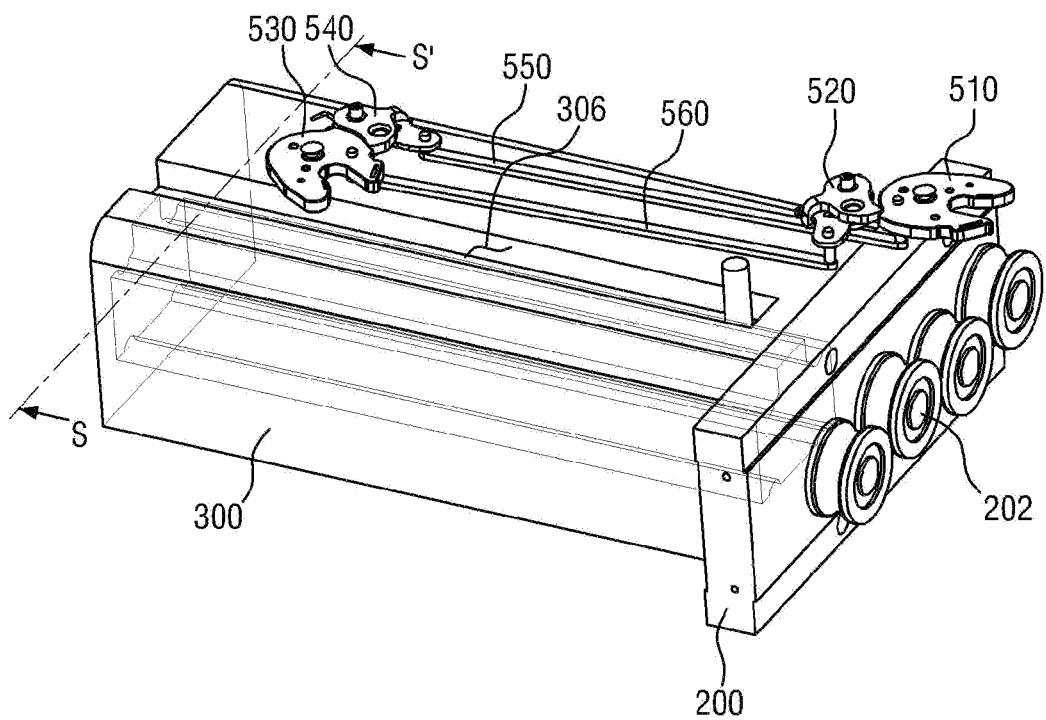
FIG. 5 is a view illustrating a state in which a slider and a rail roller unit according to an exemplary embodiment of the present invention are coupled.
Figure 6:
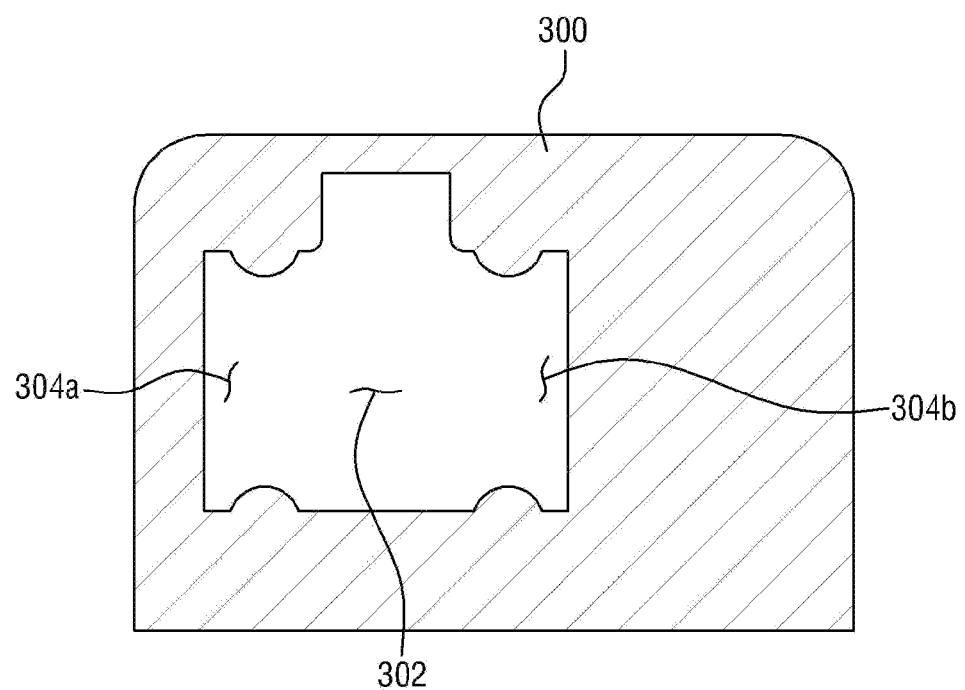
FIG. 6 is a view illustrating a cross section taken along line S-S' in FIG. 5.

FIG. 5 is a view illustrating a state in which the slider and the rail roller unit according to an exemplary embodiment of the present invention are coupled, and FIG. 6 is a view illustrating a cross section taken along line S-S' in FIG. 5.

The slider 300 is fixedly mounted, at one side in a longitudinal direction thereof, on the rail roller unit 200. The slider 300 has a predetermined length and a predetermined width. In this case, the predetermined length refers to a length when the slider does not interfere with the door 1 in a state in which the door 1 is completely closed. The predetermined width refers to a width when the slider may support the door 1. The length and the width of the slider 300 may be set without limitation.

An internal space is elongated in a longitudinal direction thereof in the slider 300, and a movement support unit 400 to be described below may be inserted into the internal space. The internal space may be referred to as a movement route along which the movement support unit 400 may roll. There is no limitation to a position of the internal space formed in the slider 300. In addition, a region of the slider 300, except for the internal space, may have a structure and a material that may maintain rigidity of the slider 300.

Referring to FIG. 6, the internal space has roller movement paths 304a and 304b in which second rollers 402 to be described below may move, and a support member movement path 302 in which a support member 401 may move. FIG. 6 illustrates that the roller movement paths 304a and 304b are formed at both sides of the support member movement path 302, but the shape of the internal space may vary depending on the shape of the movement support unit 400.

A movement hole 306 is formed in one surface of the slider 300 and elongated in the longitudinal direction of the slider 300, and a second striker 406 to be described below may move along the movement hole 306.

Figure 7:
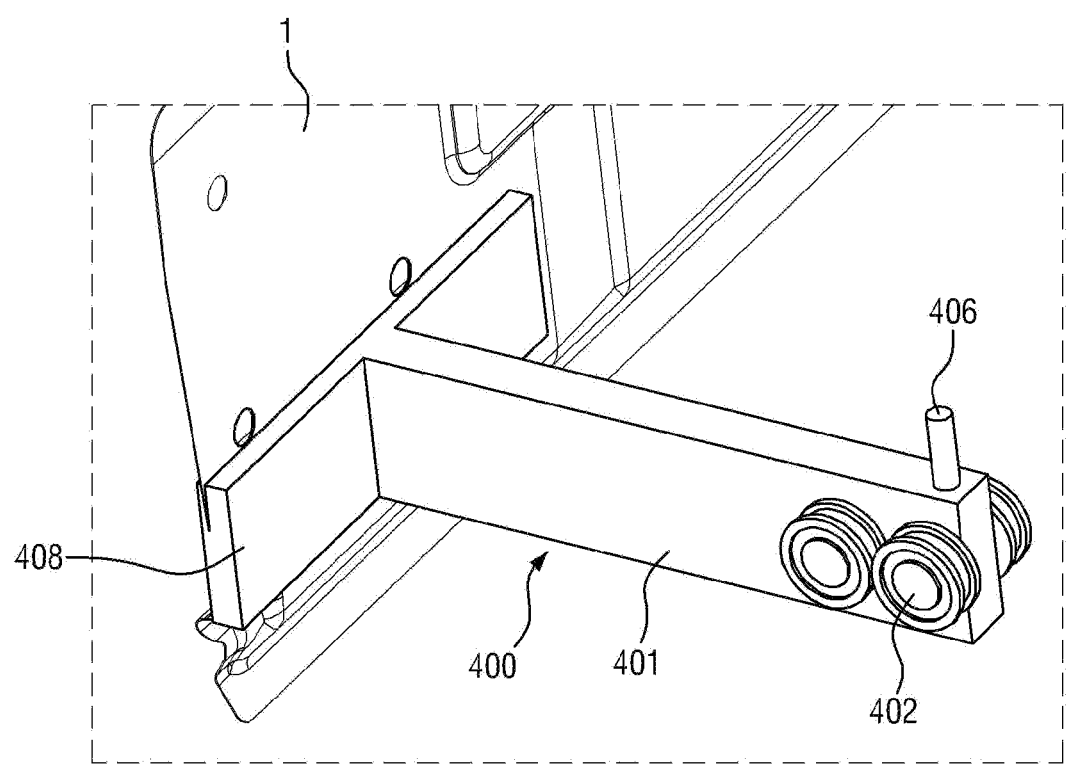
FIG. 7 is a view illustrating a movement support unit according to an exemplary embodiment of the present invention.

FIG. 7 is a view illustrating the movement support unit according to an exemplary embodiment of the present invention.

The movement support unit 400 includes the support member 401 and the second rollers 402. One end of the support member 401 may be fixedly mounted on the door 1 by means of a mounting bracket 408. The support member 401 may have a structure and a material having rigidity enough to support the door 1. The second rollers 402 are provided at the other side of the support member 401. According to an exemplary embodiment of the present invention, the second rollers 402 are provided at both sides of the support member 401, but there is no limitation to the position and the number of second rollers 402 provided on the support member 401.

As described above, the movement support unit 400 may be inserted into the internal space of the slider 300, which has a shape corresponding to the shape of the movement support unit 400, and the movement support unit 400 may roll. In this case, the second roller 402 functions as a bearing. When the movement support unit 400 mounted on the door 1 and the slider 300 mounted on the rail roller unit 200 are connected to each other, the door 1 and the vehicle body 2 face each other. In this case, the movement support unit 400 may move in the second direction with respect to the slider 300.

The second striker 406 is provided at one side of the movement support unit 400. The second striker 406 may be a catching member, which may be caught by a second catch 530 to be described below, and may have various shapes. In an exemplary embodiment of the present invention, the second striker 406 has an approximately cylindrical shape.

Figure 8:
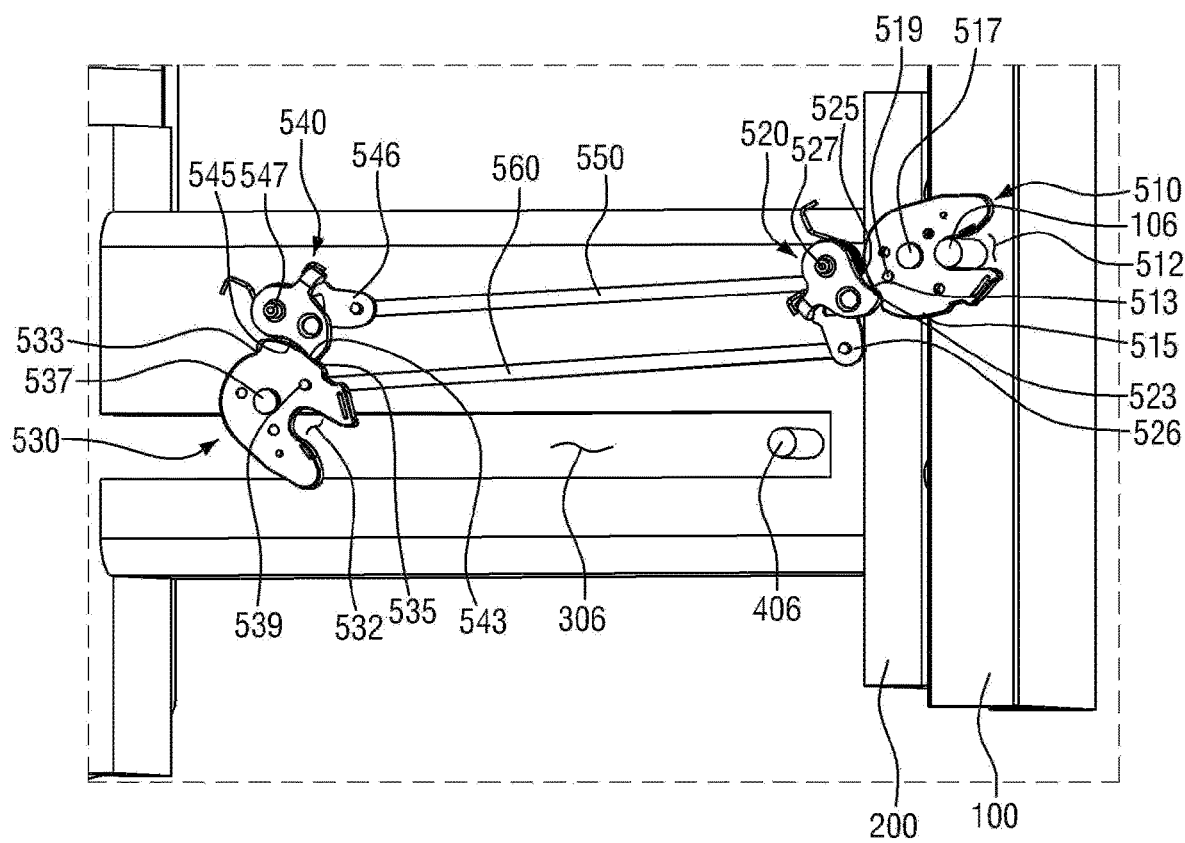
FIG. 8 is a view illustrating a catch-pawl locking unit illustrated in FIG. 5 when viewed from above.

FIG. 8 is a view illustrating the catch-pawl locking unit illustrated in FIG. 5 when viewed from above.

The catch-pawl locking unit 500 allows catches and pawls to be locked to or unlocked from each other by rotations of the catches and the pawls, thereby controlling the movement of the slider 300 in the first direction and the movement of the movement support unit 400 in the second direction. The catch-pawl locking unit 500 includes a first catch 510, a first pawl 520, a second catch 530, and a second pawl 540.

The first catch 510 includes a first insertion groove 512 recessed inward so that the first striker 106 may be inserted into the first insertion groove 512, and guide members provided at both sides of the first insertion groove 512 and configured to guide the first striker 106 so that the first striker 106 is inserted into the first insertion groove 512. The first catch 510 is rotatably connected to the rail roller unit 200. However, the first catch 510 may be rotatably coupled to the slider 300 as long as the first striker 106 may be inserted into the first insertion groove 512.

The first catch 510 includes a first catching groove 513 formed to be caught by the first pawl 520 so that the first catch 510 and the first pawl 520 are locked to each other, and a first catch unlocking portion 515 configured to provide a path along which the first pawl 520 may come into contact with the first catch unlocking portion 515 and move when the first catch 510 is unlocked from the first pawl 520.

A first catch spring, which assists the rotation of the first catch 510, may be provided on a rotation shaft 517 of the first catch 510. The first catch spring may apply elastic force to the first catch 510 in a direction toward the first striker 106 (a clockwise direction based on the rotation shaft of the first catch in FIG. 8) in a state in which the first insertion groove 512 is spaced apart from the first striker 106. Therefore, the first catch 510 may maintain its posture so as to be caught by the first striker 106.

One end of a first lever 550 may be rotatably connected to the first catch 510. A rotation shaft 519 of the first lever 550 is provided to be spaced apart from the rotation shaft 517 of the first catch 510 so that the first catch 510 is rotated in one direction (the clockwise direction based on the rotation shaft of the first catch in FIG. 8) by the movement of the first lever 550.

The first pawl 520 includes a first catching portion 523 having a shape corresponding to the first catching groove 513 and formed to be inserted into the first catching groove 513 so that the first pawl 520 may be locked to the first catch 510, a first pawl unlocking portion 525 having a shape corresponding to the first catch unlocking portion 515 and configured to provide a path along which the first pawl 520 may come into contact with the first catch 510 and move, and a first connecting portion 526 capable of being connected to a second lever 560. One end of the second lever 560 is rotatably connected to the first connecting portion 526.

In an exemplary embodiment of the present invention, the first catching portion 523 has an approximately hook shape, but there is no limitation to the shape of the first catching portion 523 as long as the first catching portion 523 corresponds to the first catching groove 513. The first pawl 520 is positioned at one side of the first catch 510 and rotatably connected to the slider 300.

A first pawl spring, which assists the rotation of the first pawl 520, may be provided on a rotation shaft 527 of the first pawl 520. The first pawl spring may apply elastic force to the first pawl 520 in a direction opposite to the direction in which the elastic force of the first catch spring is applied (a counterclockwise direction based on the rotation shaft of the first pawl in the FIG. 8). Therefore, the first pawl 520 may assist the first catch 510 in maintaining its posture so as to be caught by the first striker 106.

Referring to FIG. 8, the second catch 530 and the second pawl 540 have similar shapes to the first catch 510 and the first pawl 520, respectively.

The second catch 530 includes a second insertion groove 532 recessed inward so that the second striker 406 may be inserted into the second insertion groove 532, and guide members provided at both sides of the second insertion groove 532 and configured to guide the second striker 406 so that the second striker 406 is inserted into the second insertion groove 532. The second catch 530 is rotatably connected to the slider 300. In this case, the second insertion groove 532 is positioned in the vicinity of the movement hole 306.

The second catch 530 includes a second catching groove 533 formed to be caught by the second pawl 540 so that the second catch 530 and the second pawl 540 are locked to each other, and a second catch unlocking portion 535 configured to provide a path along which the second pawl 540 may come into contact with the second catch unlocking portion 535 and move. In an exemplary embodiment of the present invention, the second catching portion 543 has an approximately hook shape, but there is no limitation to the shape of the second catching portion 543 as long as the second catching portion 543 corresponds to the second catching groove 533.

A second catch spring, which assists the rotation of the second catch 530, may be provided on a rotation shaft 537 of the second catch 530. The second catch spring may apply elastic force to the second catch 530 in a direction toward the second striker 406 (a counterclockwise direction based on the rotation shaft of the second catch in FIG. 8) in a state in which the second insertion groove 532 is spaced apart from the second striker 406. Therefore, the second catch 530 may maintain its posture so as to be caught by the second striker 406.

The other end of the second lever 560 is rotatably connected to the second catch 530. A rotation shaft 539 of the second lever 560 is provided to be spaced apart from the rotation shaft 537 of the second catch 530 so that the second catch 530 is rotated in the other direction (a counterclockwise direction based on the rotation shaft of the second catch in FIG. 8) by the movement of the second lever 560.

The second pawl 540 includes a second catching portion 543 having a shape corresponding to the second catching groove 533 and formed to be inserted into the second catching groove 533 so that the second pawl 540 may be locked to the second catch 530, a second pawl unlocking portion 545 having a shape corresponding to the second catch unlocking portion 535 and configured to provide a path along which the second pawl 540 may come into contact with the second catch 530 and move, and a second connecting portion 546 capable of being connected to a first lever 550. The other end of the first lever 550 is rotatably connected to the second connecting portion 546.

A second pawl spring, which assists the rotation of the second pawl 540, may be provided on a rotation shaft 547 of the second pawl 540. The second pawl spring may apply elastic force to the second pawl 540 in a direction opposite to the direction in which the elastic force of the second catch spring is applied (a clockwise direction based on the rotation shaft of the second pawl in FIG. 8). Therefore, the second pawl 540 may assist the second catch 530 in maintaining its posture so as to be caught by the second striker 406.

Figure 9A:
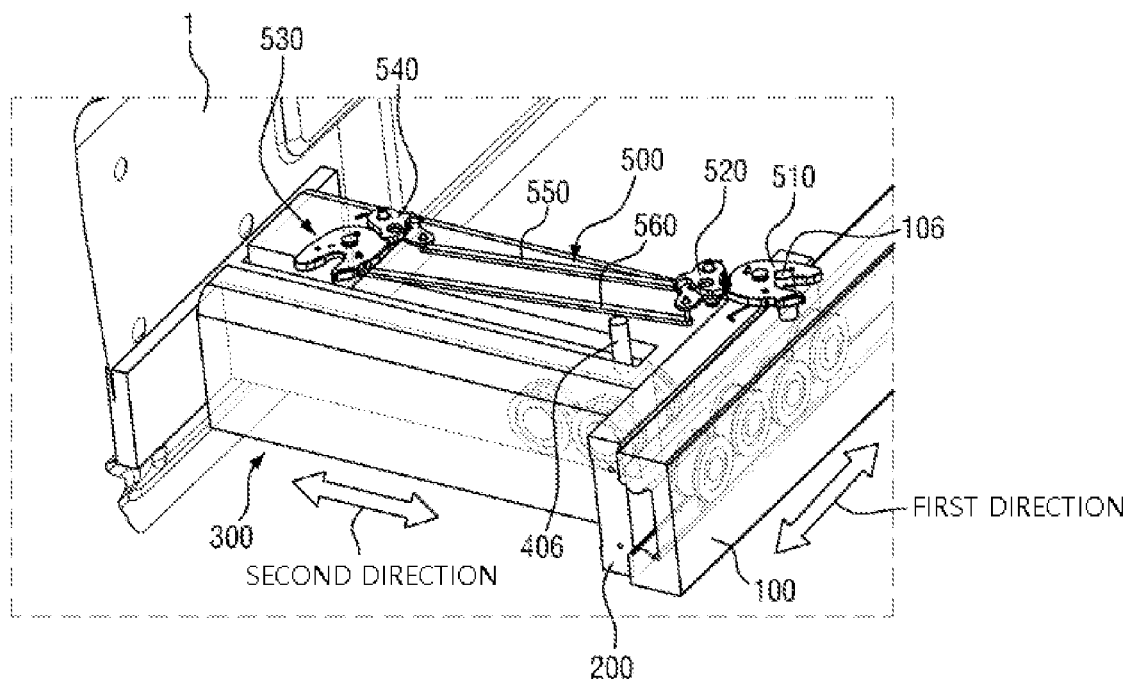
FIGS. 9A and 9B are views illustrating a process of operating the structure for preventing a sliding door from swaying according to an exemplary embodiment of the present invention while the door moves from a closed state to an opened state.
Figure 9B:
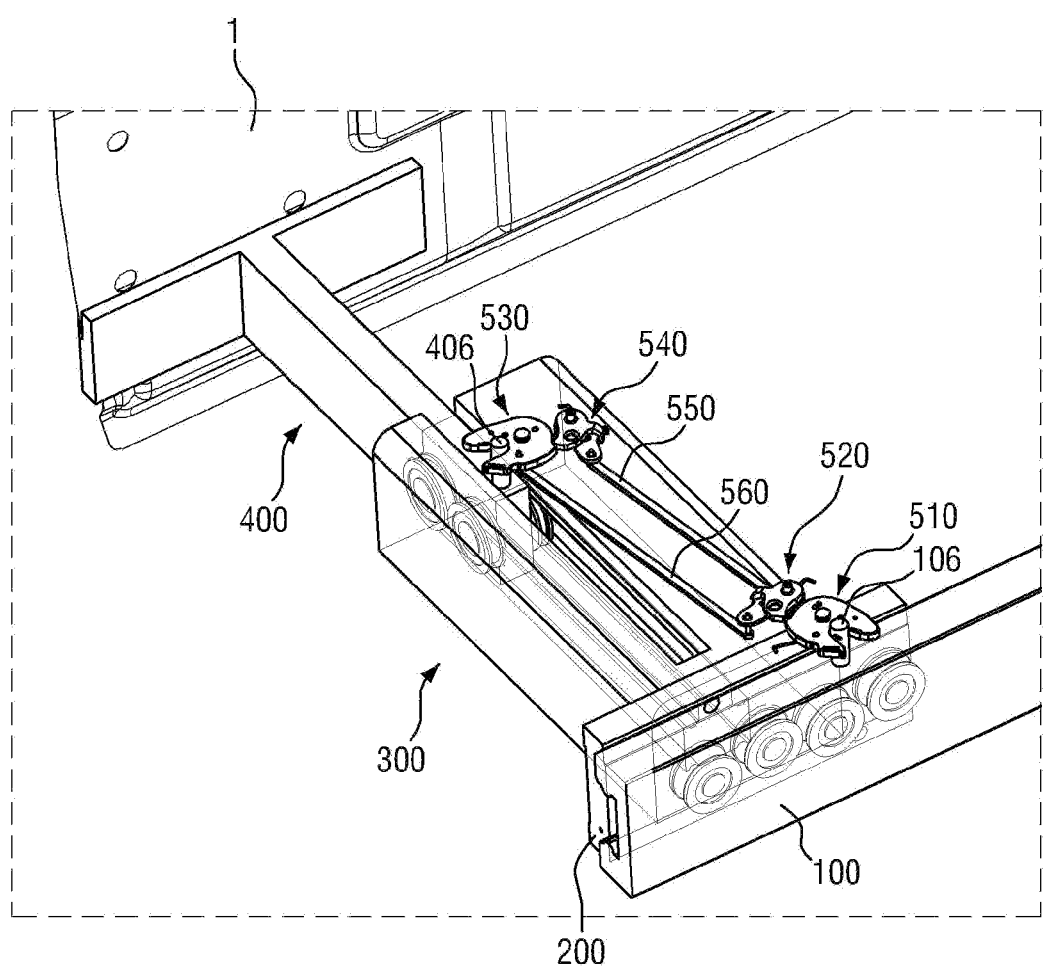
Figure 10A:
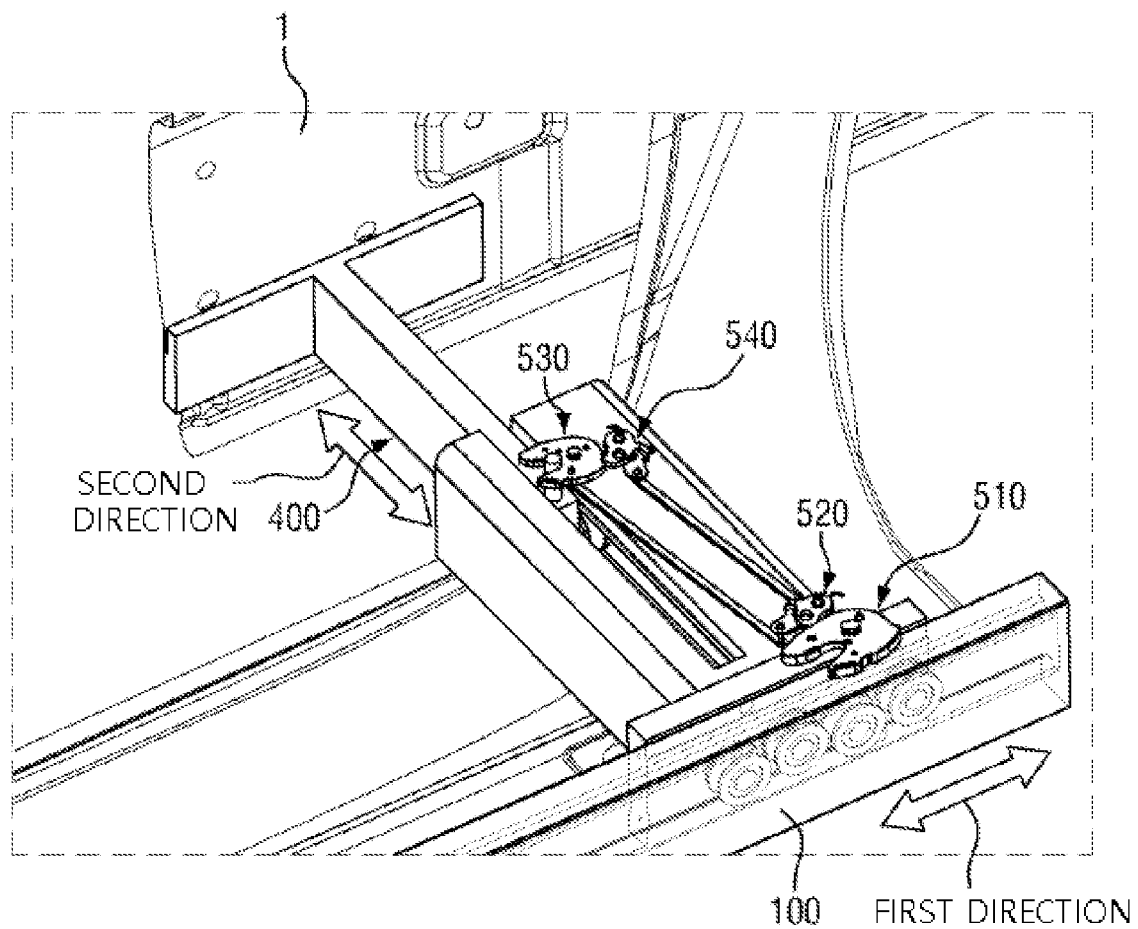
FIGS. 10A and 10B are views illustrating a process of operating the structure for preventing a sliding door from swaying according to an exemplary embodiment of the present invention while the door moves from the opened state to the closed state.
Figure 10B:
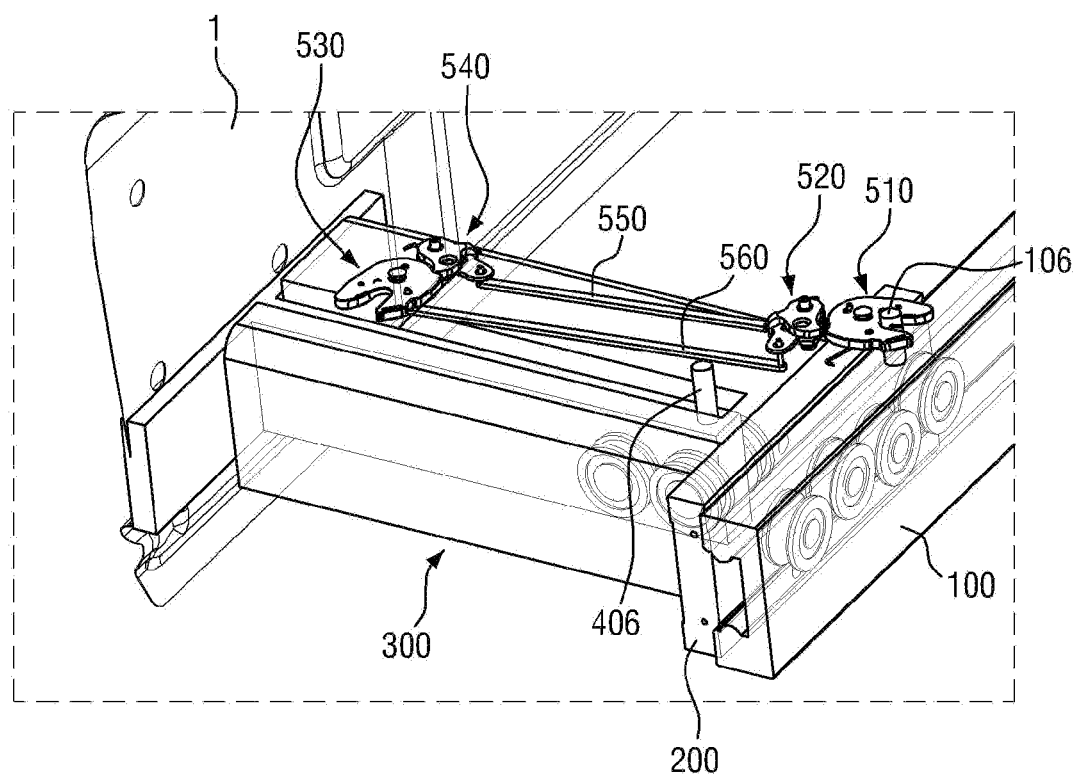

FIGS. 9A and 9B are views illustrating a process of operating the structure for preventing a sliding door from swaying according to an exemplary embodiment of the present invention while the door moves from a closed state to an opened state, and FIGS. 10A and 10B are views illustrating a process of operating the structure for preventing a sliding door from swaying according to an exemplary embodiment of the present invention while the door moves from the opened state to the closed state.

First, a process of operating the sway prevention structure according to an exemplary embodiment of the present invention while the door 1 moves from the closed state to the opened state will be described with reference to FIGS. 9A and 9B.

FIG. 9A illustrates that the door 1 is in the closed state. The rail roller unit 200 is positioned on the lower rail 100 at a completely closed position of the door 1, and the movement support unit 400 is completely inserted into the slider 300. In this case, the second striker 406 is positioned at one end of the movement hole 306.

The first catch 510 is rotated somewhat in the second direction so that the first striker 106 is inserted into the first insertion groove 512. Since the first catching portion 523 is caught by the first catching groove 513, the first catch 510 and the first pawl 520 are locked to each other and cannot be rotated. Therefore, since the first catch 510 and the first pawl 520 are locked, the rail roller unit 200 cannot be moved in the first direction, specifically, in a direction in which the door 1 is opened in the first direction. In this case, the door 1 and the slider 300 connected to the rail roller unit 200 cannot of course be moved in the first direction.

The second catch 530 is rotated somewhat in the second direction so that the second insertion groove 532 faces the second striker 406. Since the second catch unlocking portion 535 and the second pawl unlocking portion 545 are in contact with each other, the second catch 530 and the second pawl 540 are not locked to each other. Therefore, the movement support unit 400 may move in the second direction, specifically, in a direction in which the door 1 and the vehicle body 2 move away from each other in the second direction.

In this state, a process of operating the second catch 530 and the second pawl 540 will be described. As the movement support unit 400 moves, the second striker 406 moves to the other side of the movement hole 306 and then is inserted into the second insertion groove 532. When the movement support unit 400 further moves, the second catch 530 rotates in one direction (a clockwise direction based on the rotation shaft of the second catch in FIG. 9A), and the second pawl 540 rotates in the other direction (a counterclockwise direction based on the rotation shaft of the second pawl in FIG. 9A). In this case, when the second catching portion 543 is moved along the second catch unlocking portion 535 and then caught by the second catching groove 533, the second catch 530 and the second pawl 540 are locked to each other and cannot be rotated.

A process of operating the first lever 550 and the second lever 560 will be described. As the second pawl 540 rotates, the first lever 550 moves in a direction toward the position of the first catch 510 to rotate the first catch 510 in the other direction (a counterclockwise direction based on the rotation shaft of the first catch in FIG. 9A). Further, as the second catch 530 rotates, the second lever 560 moves in a direction toward the position of the second catch 530 to rotate the second pawl 540 in one direction (a clockwise direction based on the rotation shaft of the first pawl in FIG. 9A). In the state in which the first catch 510 and the first pawl 520 are locked to each other, the first catching portion 523 is drawn from the first catching groove 513 and moved along the first catch unlocking portion 515 by the operations of the first and second levers 550 and 560, and as a result, the first catch 510 and the first pawl 520 are unlocked from each other. Therefore, the rail roller unit 200 may move in the first direction, specifically, in the direction in which the door 1 is opened in the first direction.

FIG. 9B illustrates a state in which the movement support unit 400 cannot be moved in the direction in which the door 1 and the vehicle body 2 move away from each other in the second direction, and the rail roller unit 200 may move in the direction in which the door 1 is opened in the first direction.

Thereafter, when the door 1 operates in the direction in which the door 1 is opened, the first catch 510 is rotated in the other direction (a counterclockwise direction in FIG. 9B). As described above, the first catch 510 is smoothly rotated by the elastic force of the first catch spring.

Meanwhile, a process of operating the structure for preventing a sliding door from swaying according to an exemplary embodiment of the present invention while the door 1 moves from the opened state to the closed state may be performed in the reverse order to the above-mentioned process and may be sufficiently understood by those skilled in the art with reference to FIGS. 10A and 10B.

Meanwhile, according to an exemplary embodiment of the present invention, the slider 300 and the movement support unit 400 may prevent the sway of the door 1 while the door 1 is opened or closed, and it is possible to further prevent the sway of the door 1 because the door 1 rectilinearly moves only in any one of the first and second directions.

The present invention has been described with reference to the limited exemplary embodiments and the drawings, but the present invention is not limited thereto. The described exemplary embodiments may be variously changed or modified by those skilled in the art to which the present invention pertains within the technical spirit of the present invention and within the scope equivalent to the appended claims.

What is claimed is:

1. A structure for preventing a sliding door from swaying, the structure comprising:
    a rail configured to be mounted on a vehicle body in a longitudinal direction of the vehicle body;
    a rail roller device rollably connected to the rail;
    a slider mounted on the rail roller device;
    a movement support device having a first side configured to be fixed to a door and a second side rollably connected to the slider, the movement support device being configured to support the door; and
    a catch-pawl locking device comprising catches and pawls configured to be locked to or unlocked from one another while rotating, the catches and the pawls comprising a first catch and a first pawl configured to restrict a movement of the rail roller device in a first direction when the first catch and the first pawl are locked to each other, and a second catch and a second pawl configured to restrict a movement of the movement support device in a second direction perpendicular to the first direction when the second catch and the second pawl are locked to each other, wherein the first catch, the first pawl, the second catch, and the second pawl are configured to operate in conjunction with one another, such that the door moves in one of the first and second directions and then move in the other of the first and second directions while the door is opened or closed.

2. The structure of claim 1, wherein the rail is configured to be mounted at a lower side of the vehicle body.

3. The structure of claim 1, further comprising a first striker on the rail, wherein the first catch is configured to be rotated by being caught by the first striker.

4. The structure of claim 1, further comprising an internal space in the slider, wherein the movement support device is inserted into the internal space.

5. The structure of claim 1, further comprising a second striker on the movement support device, wherein the second catch is configured to be rotated by being caught by the second striker.

6. The structure of claim 5, wherein the slider includes a movement hole, and wherein the movement hole is a movement path for the second striker.

7. The structure of claim 1, wherein the movement support device comprises:
a support member mounted on the door; and
a roller rotatably connected to the support member.

8. The structure of claim 1, wherein the catch-pawl locking device comprises:
a first lever configured to connect the first catch and the second pawl; and
a second lever configured to connect the second catch and the first pawl.

9. The structure of claim 1, wherein:
the second pawl and the second catch are unlocked from each other when the first pawl and the first catch are locked to each other; and
the second pawl and the second catch are locked to each other when the first pawl and the first catch are unlocked from each other.

10. The structure of claim 1, wherein the first catch has a catching groove and the first pawl has a catching portion configured to be caught by the catching groove.

11. The structure of claim 1, wherein the door is configured to move in the second direction and then move in the first direction while the door is opened.

12. The structure of claim 1, wherein the door is configured to move in the first direction and then move in the second direction while the door is closed.

13. A structure for preventing a sliding door from swaying, the structure comprising:
a rail configured to be mounted on a vehicle body in a longitudinal direction of the vehicle body;
a rail roller device rollably connected to the rail;
a slider mounted on the rail roller device;
a movement support device having a first side configured to be fixed to a door and a second side rollably connected to the slider, the movement support device being configured to support the door;
a catch-pawl locking device comprising catches and pawls configured to be locked to or unlocked from one another while rotating, the catches and the pawls comprising a first catch and a first pawl configured to restrict a movement of the rail roller device in a first direction when the first catch and the first pawl are locked to each other, and a second catch and a second pawl configured to restrict a movement of the movement support device in a second direction perpendicular to the first direction when the second catch and the second pawl are locked to each other; and
a first spring on a rotation shaft of the first catch to apply elastic force;
wherein the first catch includes an insertion groove having a shape recessed inward; and
wherein the first catch, the first pawl, the second catch, and the second pawl are configured to operate in conjunction with one another, such that the door is configured to move in one of the first and second directions and then move in the other of the first and second directions while the door is opened or closed.

14. The structure of claim 13, further comprising a second spring on a rotation shaft of the first pawl to apply elastic force in a direction opposite to the direction in which the elastic force of the first spring is applied.

15. A vehicle comprising:
a vehicle body;
a sliding door coupled to the vehicle body;
a rail mounted on a lower side of the vehicle body in a longitudinal direction of the vehicle body;
a rail roller device rollably connected to the rail;
a slider mounted on the rail roller device;
a movement support device having a first side fixed to the sliding door and a second side rollably connected to the slider, the movement support device being configured to support the sliding door; and
a catch-pawl locking device comprising catches and pawls configured to be locked to or unlocked from one another while rotating, the catches and the pawls comprising a first catch and a first pawl configured to restrict a movement of the rail roller device in a first direction when the first catch and the first pawl are locked to each other, and a second catch and a second pawl configured to restrict a movement of the movement support device in a second direction perpendicular to the first direction when the second catch and the second pawl are locked to each other,
wherein the first catch, the first pawl, the second catch, and the second pawl are configured to operate in conjunction with one another, such that the sliding door is configured to move in one of the first and second directions and then move in the other of the first and second directions while the sliding door is opened or closed.

16. The vehicle of claim 15, further comprising a first striker on the rail, wherein the first catch is configured to be rotated by being caught by the first striker.

17. The vehicle of claim 15, further comprising an internal space in the slider, wherein the movement support device is inserted into the internal space.

18. The vehicle of claim 15, further comprising a second striker on the movement support device, wherein the second catch is configured to be rotated by being caught by the second striker.

19. The vehicle of claim 18, wherein the slider includes a movement hole, and wherein the movement hole is a movement path for the second striker.

20. The vehicle of claim 15, wherein the movement support device comprises:
a support member mounted on the door; and
a roller rotatably connected to the support member.

* * * * *